United States Patent
Quach et al.

(10) Patent No.: US 7,548,325 B2
(45) Date of Patent: Jun. 16, 2009

(54) METHOD AND SYSTEM TO MANAGE MULTIPLE FORMAT FONTS IN AN IMAGE GENERATING DEVICE

(75) Inventors: Tony T. Quach, Anaheim, CA (US); Vincent Wu, Irvine, CA (US); Truc Nguyen, San Diego, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 966 days.

(21) Appl. No.: 10/674,738

(22) Filed: Sep. 30, 2003

(65) Prior Publication Data

US 2005/0068556 A1 Mar. 31, 2005

(51) Int. Cl.
*G06K 15/02* (2006.01)

(52) U.S. Cl. .............. 358/1.11; 358/1.15; 358/1.9; 358/1.13; 358/1.16

(58) Field of Classification Search ............... 358/1.15, 358/1.11, 1.14, 1.16, 1.9; 395/171, 167; 345/468, 471

See application file for complete search history.

(56) References Cited

U.S. PATENT DOCUMENTS

| | | | |
|---|---|---|---|
| 5,233,683 A | 8/1993 | Sasaki | |
| 5,533,174 A | 7/1996 | Flowers, Jr. et al. | |
| 5,572,631 A * | 11/1996 | Kavathekar et al. | 358/1.16 |
| 5,586,242 A * | 12/1996 | McQueen et al. | 345/467 |
| 5,606,649 A * | 2/1997 | Tai | 358/1.11 |
| 5,675,718 A | 10/1997 | Miller | |
| 5,729,666 A | 3/1998 | Konsella et al. | |
| 5,732,197 A | 3/1998 | Nakagiri | |
| 5,781,714 A * | 7/1998 | Collins et al. | 345/471 |
| 6,252,671 B1 | 6/2001 | Peng et al. | |
| 6,323,865 B1 | 11/2001 | Collettie | |
| 6,351,314 B1 | 2/2002 | Nakagiri | |
| 6,426,751 B1 * | 7/2002 | Patel et al. | 345/468 |
| 6,507,407 B1 | 1/2003 | Matsumoto | |
| 7,319,532 B2 * | 1/2008 | Oomura et al. | 358/1.11 |
| 2002/0159084 A1 | 10/2002 | Daniels et al. | |
| 2003/0030830 A1 | 2/2003 | Yamamura | |
| 2003/0038958 A1 * | 2/2003 | Salgado et al. | 358/1.11 |
| 2004/0145760 A1 * | 7/2004 | Kurumida | 358/1.11 |

* cited by examiner

*Primary Examiner*—David K Moore
*Assistant Examiner*—Vu B Hang
(74) *Attorney, Agent, or Firm*—Tucker Ellis & West LLP

(57) ABSTRACT

The present invention is directed to a method and system for managing multiple format fonts in an image generating device. More particularly, the present invention is directed to a method and system to store a font in a selected storage area, remove a selected font stored in the selected storage area, and locate a selected font stored in a selected storage area.

14 Claims, 5 Drawing Sheets

Font Management

| | Upload Software | Remove Software | Back-up | Restore | Delete Files | Font Management |

☑ PCL  ☑ PS

| △ Name | Type | Size (KB) |
|---|---|---|
| ☑ hs_er_pid32235.log | PS | 19 |

Add   Remove   ▷ REFRESH

*Fig. 7*

Upload Font to Controller

☑ PCL  ☑ PS

Font File: [_____] Browse...

Upload   Cancel

*Fig. 8*

METHOD AND SYSTEM TO MANAGE MULTIPLE FORMAT FONTS IN AN IMAGE GENERATING DEVICE

BACKGROUND OF THE INVENTION

The present invention is directed to a method and system for managing multiple format fonts in an image generating device. More particularly, the present invention is directed to a method and system to store a font in a selected storage area, remove a selected font stored in the selected storage area, and locate a selected font stored in a selected storage area.

A typical image generating device includes a fixed set of fonts that a user can invoke for image generation. For example, if the user desires to have additional fonts supported in the printer, the user will have to make a request to the printer manufacturer and then would have to wait for a new software/firmware release with the expanded font set from the manufacturer. If the user has purchased a font and wants print with the new font, the new font has to be embedded in the print job by the application software. Every document that uses the new font must have the font embedded in the print data stream. The user may also need to convert the new font to a supported format before the font can be used with the software or the printer.

It is desirable to have a method and system which allows a user to manage multiple format in a image generating device. It is also desirable to have a method and system for managing multiple fonts which eliminates the extra step of conversion or concatenation of font data before it can be downloaded and eliminates the need to embed the font data in the image generating jobs.

SUMMARY OF THE INVENTION

In accordance with the present invention, there is provided a method and system which allows a user to manage multiple format in a image generating device.

Further, in accordance with the present invention, there is provided a method and system to store a font in a selected storage area, remove a selected font stored in the selected storage area, and locate a selected font stored in a selected storage area.

Further, in accordance with the present invention, there is provided a method and system for managing which eliminates the extra step of conversion or concatenation of font data before it can be downloaded Still further, in accordance with the present invention, there is provided a method and system to manage multiple format fonts in an image generating device. A management request is received from an associated user to store a font in a selected storage area of the image generating device. The type of font to be stored is determined and a new font file is selectively generated. When the font to be stored is a PostScript font, selected PostScript language code is pre-appended to the PostScript font data to create a new font file. When the font to be stored is a PCL font, selected PJL software commands are pre-appended to the PCL font data to create a new font file. When the font to be stored is other than a PostScript font or PCL font, the font is converted to a PCL font and selected PJL software commands are pre-appended to the converted PCL font data to create a new font file. In a preferred embodiment, the management request is received from the user via a web administration tool.

Still further, in accordance with the present invention, there is provided a method and system to manage multiple format fonts in an image generating device. A management request is received from an associated user to remove a selected font from a selected storage area of an image generating device. A new file is created which includes a selected command and the font to be removed. A determination is made if the selected font is stored in the storage area. Upon a determination that the selected font is stored in the storage area, the selected font is removed from the storage area. In a preferred embodiment, the management request is received from the user via a web administration tool.

Still further, in accordance with the present invention, there is provided a method and system to manage multiple format fonts in an image generating device. A management request is received from an associated user to locate a selected type of font stored in a selected storage area of the image generating device. A determination is made if the selected type of font is stored in the storage area. A list of fonts corresponding to the selected type of font is generated. The list of fonts is transmitted to the associated user via at least one of displaying the list of fonts on a display means and generating test documents listing the fonts. In a preferred embodiment, the management request is received from the user via a web administration tool.

These and other aspects and advantages of the present invention will be understood by one skilled in the art upon reading and understanding the specification.

BRIEF DESCRIPTION OF THE DRAWINGS

FIG. 7 is a preferred template for a web administration tool for managing multiple fonts according to the present invention.

FIG. 8 is a preferred template for a user to request that a selected font be uploaded to the image generating device via a web administration tool.

DETAILED DESCRIPTION OF THE PREFERRED EMBODIMENT

Figure 1:
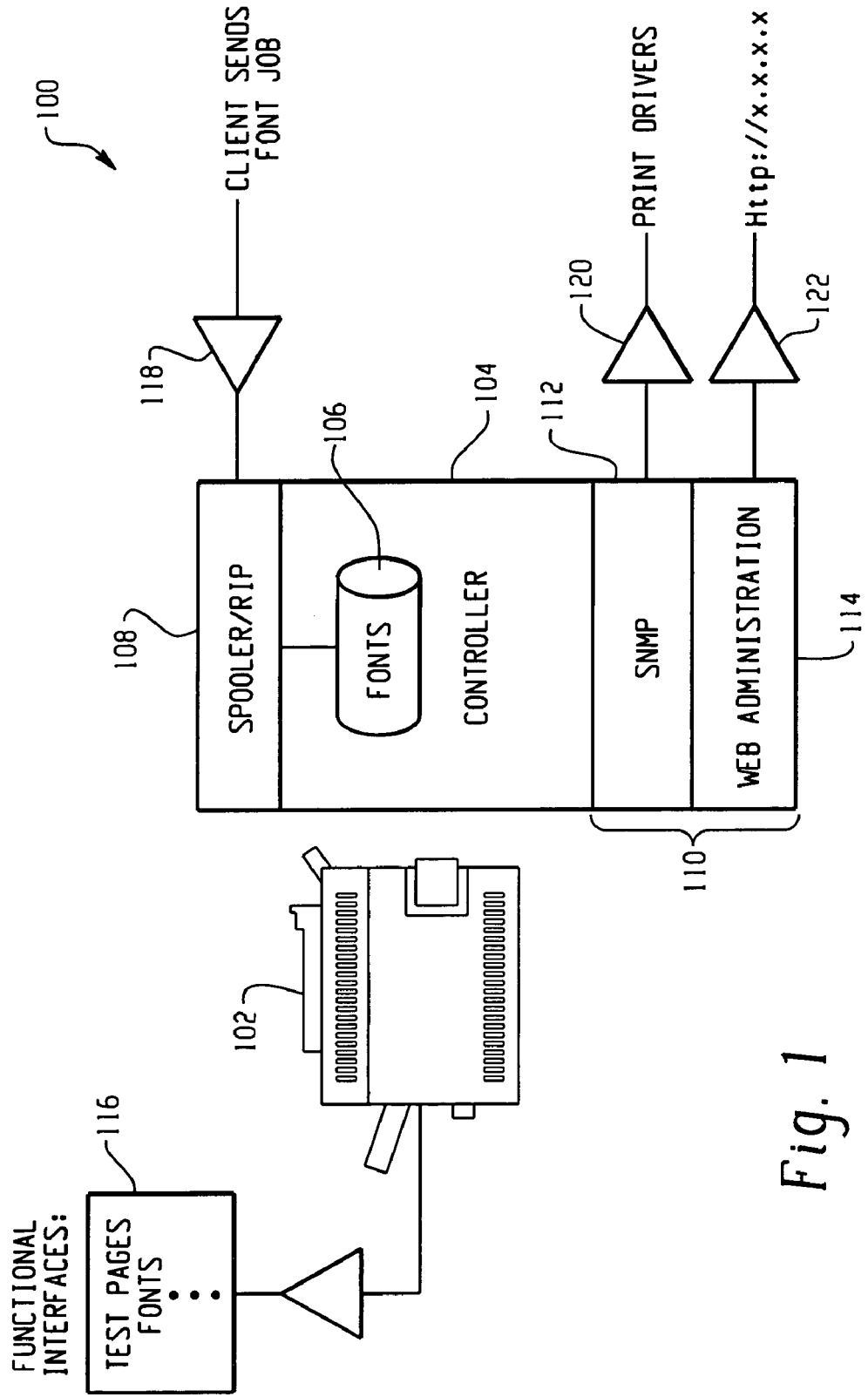
FIG. 1 is a illustration of the system according to the present invention.

The present invention is directed to a method and system for managing multiple fonts in an image generating device. Referring to FIG. 1, the system 100 includes an image generating device 102. The image generating device is any suitable image generating device known the art. Suitable image generating devices include, but are not limited to, printing devices, facsimile devices, copying devices, video display monitors, and the like. Preferably, the image generating device is a printing device. The image generating device 102 comprises a controller 104 for controlling the functions of the image generating device. The controller includes a storage area 106 for storing at least selected fonts. The controller 104 also comprises a raster image processor or spooler 108 for processing image data. The image generating device further comprises communication means 110 for communication with associated drivers and associated users. Such communication means include means to communicate via simple management network protocol 112 and through a web administration tool or user interface 114. The web administration tool is any suitable web administration tool known in the art. Suitable web administration tools include, but are not limited to, Microsoft FrontPage, Novell Netware Enterprise Server, Netware Web Manager, SQL, NT, or the like. The image generating device also comprises means for displaying and testing fonts 116.

In operation, the image generating device receives management requests from an associated user as shown by 118 and responds to such commands via at least one of simple management network protocol commands a shown by 120 and through a web administration tool as shown by 122.

Figure 2:
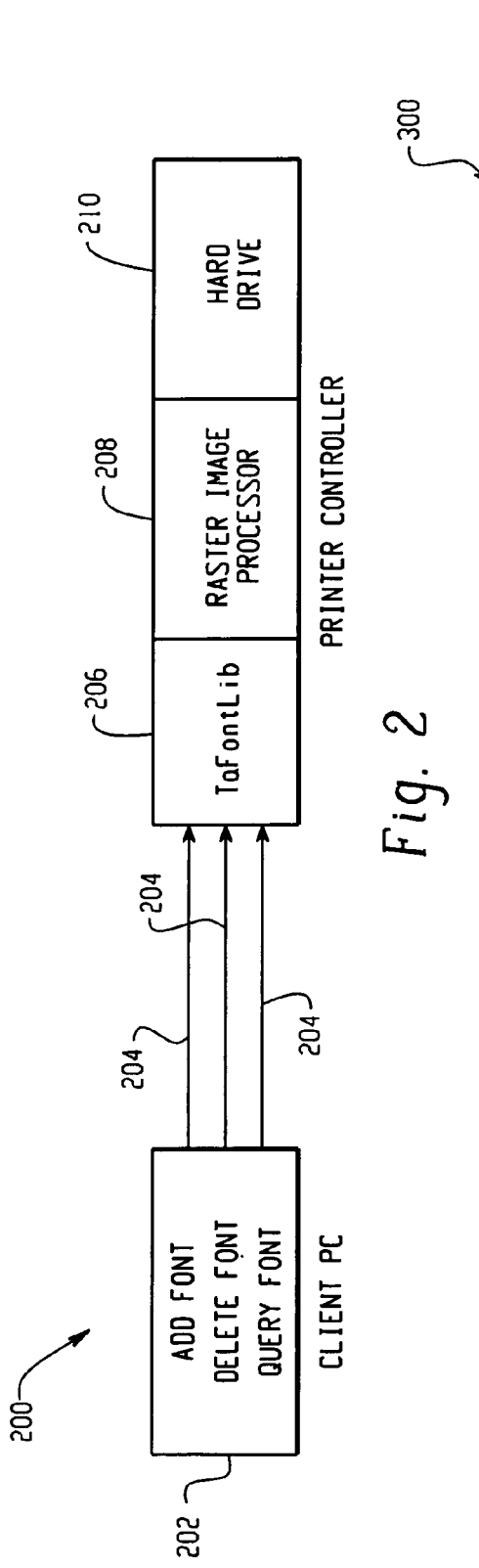
FIG. 2 is a basic flow diagram of the method and system according to the present invention.

FIG. 2 shows a basic flow diagram 200 of the method and system of the present invention. A user using an associated workstation or browser 202 submits a management request 204 to the image generating device. The management request is at least one of a request to store a selected font in the storage area of the image generating device, a request to delete a selected font from the storage area of the image generating device, and a request to query whether a selected font is stored in the storage area of the image generating device. The management request is received by the image generating device as shown by 206. Based on the management request received, a new file containing selected font data may be created as discussed in detail below. The new file is processed by the raster image processor 208 and stored in the selected storage area 210, such as a hard drive.

Figure 3:
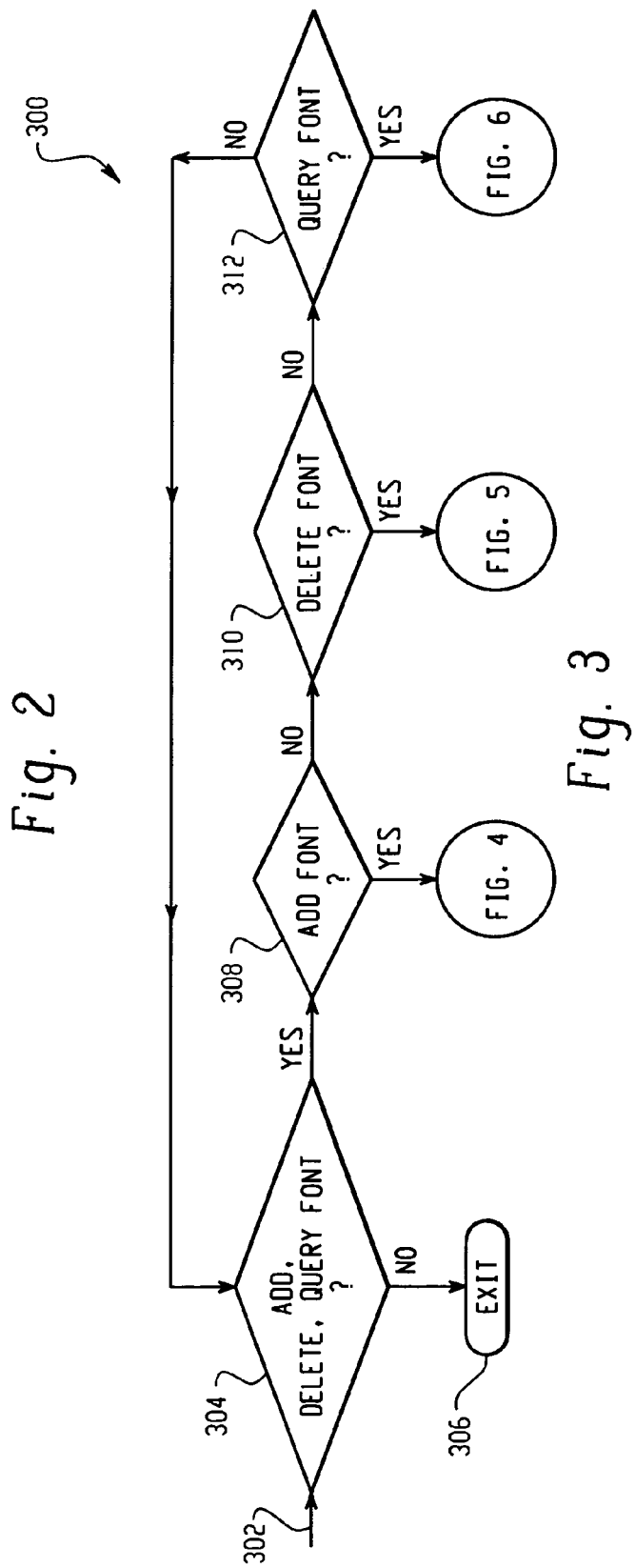
FIG. 3 is a flow chart illustrating the method to manage multiple fonts in an image generating device.

FIG. 3 is flow chart 300 illustrating the method for managing multiple formats in the image generating device. The image generating device receives a management request from a user as shown by 302. The determination is made as whether the request is to a request to store a selected font in the storage area of the image generating device, a request to delete a selected font from the storage area of the image generating device, or a request to query whether a selected font is located in the storage area of the image generating device as shown by 304. Upon a negative determination, flow proceeds to 306 and the process ends.

If the determination is positive, flow proceeds to 308, wherein a determination is made as to whether the request is to store a selected font in the storage area of the image generating device. Upon a positive determination, the flow proceeds to FIG. 4, described in detail below.

Upon a negative determination, flow proceeds to 310, wherein a determination is made as to whether the request is to delete a selected from the storage area of the image generating device. If the determination is determination is positive, flow proceeds to FIG. 5, described in detail below.

Upon a negative determination, flow proceeds to 312, wherein a determination is made as to whether the request is to query whether a selected font is located in the storage area of the image generating device. If the determination is positive, flow proceeds to FIG. 6, described in detail below. If the determination is negative, flow proceeds to 306 and the process ends.

Figure 4:
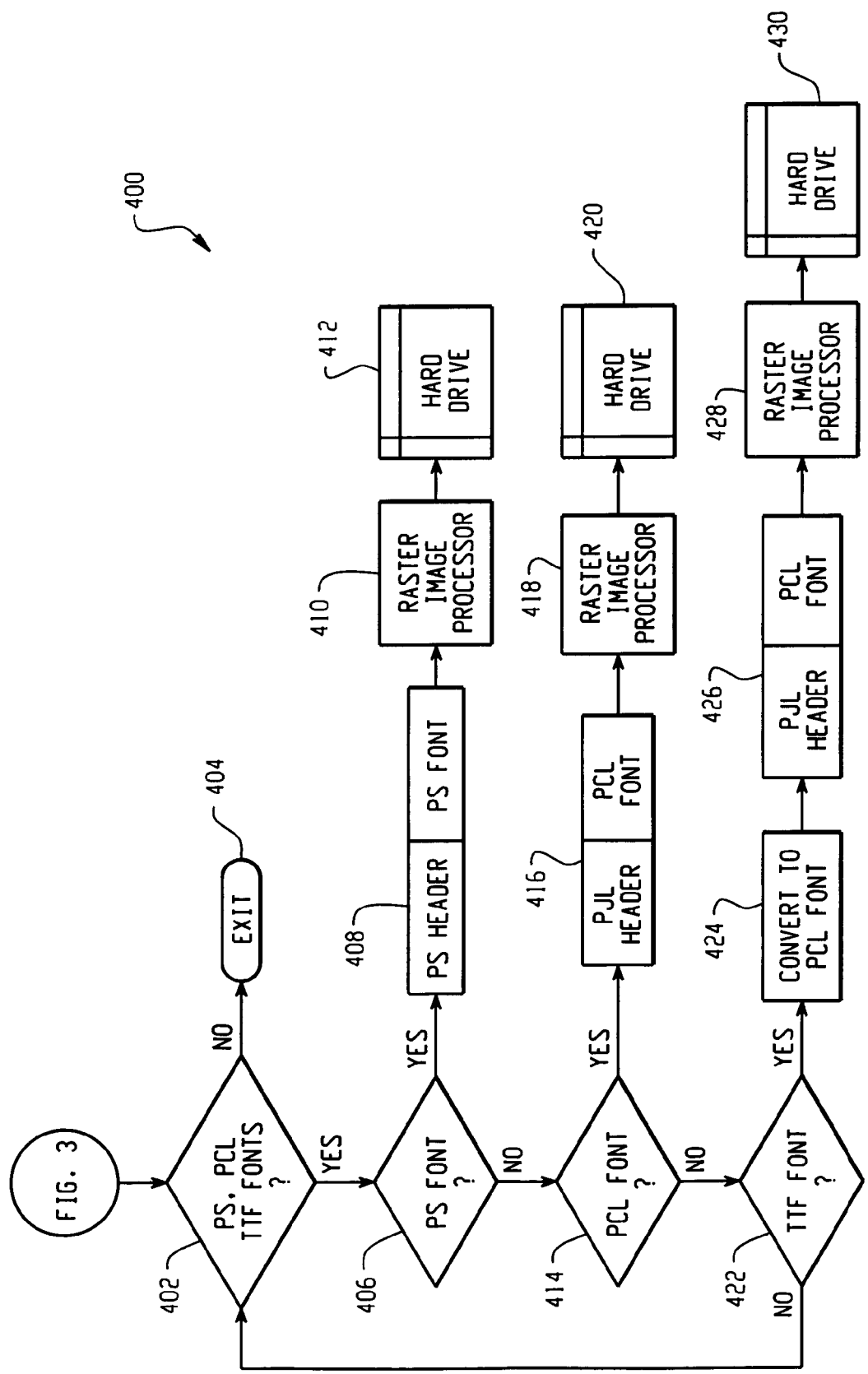
FIG. 4 is a flow chart illustrating storing an additional font in a selected storage of the image generating device.

Referring to FIG. 4, there is shown a flow chart 400 illustrating storing a selected font in a selected storage area of the image generating device. A determination is to the type of font to be stored as shown at 402. Preferably, a determination is made as to whether the font is a predetermined type of font. More preferably, a determination is made as whether the font is a PostScript font, a PCL font, or a font other than a PostScript font or a PCL font. In a more preferred embodiment, a determination is made as to whether the font is a PostScript font, a PCL font, or a TrueType font. If the font is not a predetermined type of font, the flow proceeds to 404 and the process ends. Preferably, an error message is generated and displayed to the user.

Upon a positive determination that the font is a predetermined type of font, flow proceeds to 406, wherein a determination is made whether the font to be stored is a PostScript font. If the determination is positive, flow proceeds to 408, wherein selected PostScript language code is pre-appended to the PostScript font data to create a new font file. The new font file is then processed by an associated raster image processor as shown at 410 and the processed file is stored in the storage area as shown at 412.

If the font to be stored is not a PostScript font, flow proceeds to 414, wherein a determination is made as whether the font to be stored is a PCL font. If the determination is positive, flow proceeds to 416, wherein selected PJL software commands are pre-appended to the PCL font data to create a new font file. The new font file is then processed by an associated raster image processor as shown at 418 and the processed file is stored in the storage area as shown at 420.

If the font to be stored is not a PCL font, flow proceeds to 422, wherein a determination is made as whether the font to be stored is a selected font other than a PostScript font or a PCL font. Preferably, a determination is made as whether the font is a TrueType font. If the determination is positive, the selected font is converted to a PCL font as shown at 424. Flow proceeds to 426 wherein selected PJL software commands are pre-appended to the PCL font data to create a new font file. The new font file is then processed by an associated raster image processor as shown at 428 and the processed file is stored in the storage area as shown at 430.

Figure 5:
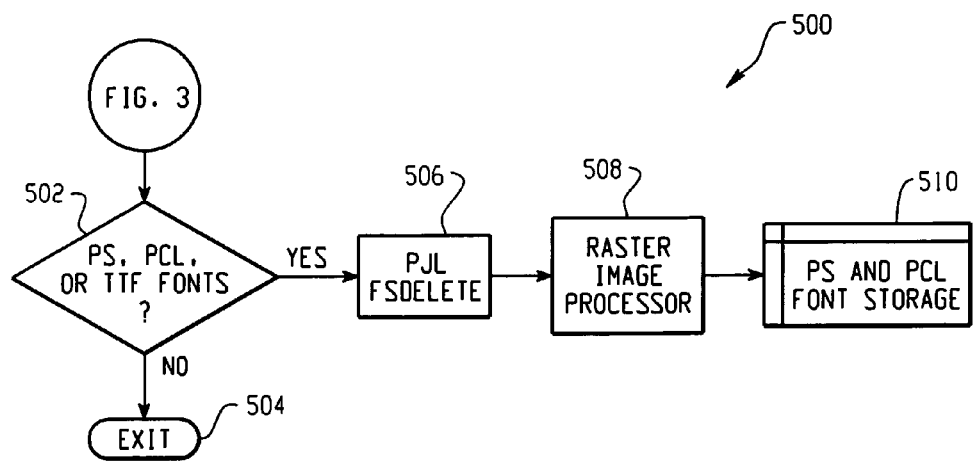
FIG. 5 is a flow chart illustrating removing a selected font from the storage area of the image generating device.

FIG. 5 is a flow chart 500 illustrating deleting a selected font from the storage area of the image generating device. A determination is to the type of font to be stored as shown at 502. Preferably, a determination is made as to whether the font is a predetermined type of font. More preferably, a determination is made as whether the font is a PostScript font, a PCL font, or a font other than a PostScript font or a PCL font. In a more preferred embodiment, a determination is made as to whether the font is a PostScript font, a PCL font, or a TrueType font. If the font is not a predetermined type of font, the flow proceeds to 504 and the process ends. Preferably, an error message is generated and displayed to the user.

Upon a positive determination that the font is a predetermined type of font, flow proceeds to 506, wherein a new file is created which includes a selected software command and the name of the font. Preferably, the file name includes a selected PJL software command and the name of the font. More preferably, the file name includes a @PJL DELETE software command and the name of the font. The new file is then processed by an associated raster image processor as shown at 508 and the processed file is stored in the storage area as shown at 510.

Figure 6:
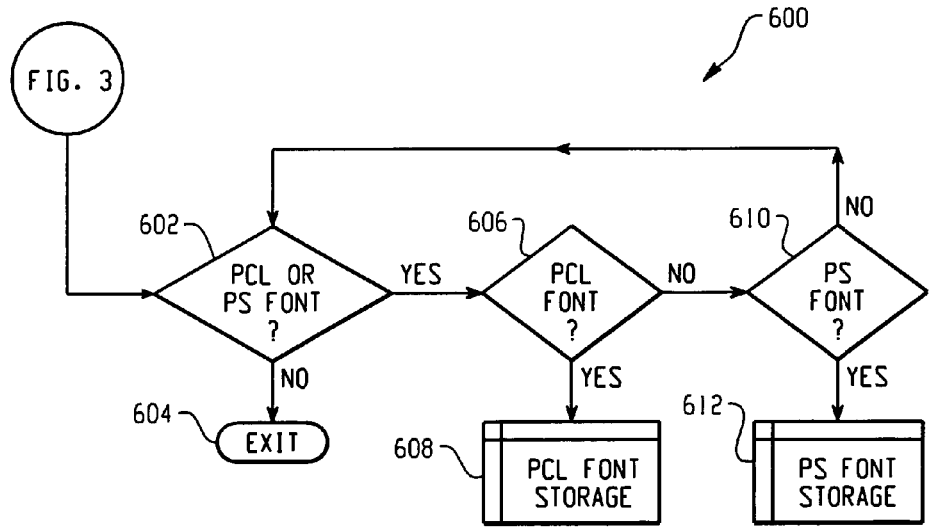
FIG. 6 is a flow chart illustrating querying whether a selected font is stored in the storage area of the image generating device.

FIG. 6 is a flow chart 600 illustrating querying whether a selected font is stored in the storage area of the image generating device. A determination is to the type of font to be stored as shown at 602. Preferably, a determination is made as to whether the font is a predetermined type of font. More preferably, a determination is made as whether the font is a PostScript font, or a PCL font. If the font is not a predetermined type of font, the flow proceeds to 604 and the process ends. Preferably, an error message is generated and displayed to the user.

Upon a positive determination that the font is a predetermined type of font, flow proceeds to 606, wherein a determination is made as whether the font is a PCL font. If the determination is positive, flow proceeds to 608 wherein the area within the storage area for storing PCL fonts is searched. If the selected font is located, a list of fonts corresponding to the selected type of font is generated and the list of fonts is transmitted to the user via at least one of displaying the list of fonts on a display means and generating test documents listing the fonts.

Upon a positive determination that the font is a predetermined type of font, flow proceeds to 610, wherein a determination is made as whether the font is a PostScript font. If the determination is positive, flow proceeds to 612 wherein the area within the storage area for storing PostScript fonts is searched. If the selected font is located, a list of fonts corresponding to the selected type of font is generated and the list of fonts is transmitted to the user via at least one of displaying the list of fonts on a display means and generating test documents listing the fonts.

In a preferred embodiment, the image generating device receives management requests from an associated user via a web administration tool or user interface. A sample font management template 700 is shown in FIG. 7. The user enters the font name at 702, the type of font at 704, and the size of the font, if known, at 706. The user then may select to add such font by select Add 708 or Remove 710. The user may also select to query fonts stored in the controller. The user can select the PCL box 712 to access the list of PCL fonts or select the PS box 714 to access the list of PS fonts. The user may also query whether a selected font is stored in the controller by inputting the name 702, type 704, and size 706 and checking box 716 to query the font. Once the user has entered the desired management request, the management request is received by the image generating device and processed as discussed above.

In a preferred embodiment, if the management request is to store storing a selected font in a selected storage area of the image generating device, the web administration tool prompts the user to upload the selected font to the controller of the image generating device for appropriate storage as discussed above. A sample template 800 for uploading the font is shown in FIG. 8. The user selects the type of font as PCL 802, PS, 804, or neither if it is another type of font. The user then inputs the name of the font file 806. The user has the ability to browse all available font files by selecting Browse 808. Once the user has entered the required information, the user may select to upload the font by selecting Upload 810 or to cancel the process by selecting Cancel 812.

What is claimed is:

1. A method to manage multiple format fonts in an image generating device, in a document processing device controller, comprising the steps of:

receiving a management request from an associated user workstation via an associated data network to store a font in a selected storage area of the image generating device;

receiving, from the networked workstation, non-bitmapped font data corresponding to a received management request;

determining, from the received font data, the type of font to be stored;

selectively generating a new, non-bitmapped font file such that:

when the font to be stored is a PostScript font, pre-appending selected PostScript language code to the PostScript font data to create a new font file inclusive of a PostScript Language code portion and a font data portion containing the received font data in its native form, when the font to be stored is a printer command language font, pre-appending selected printer job language software commands to the printer command language font data to create a new font file inclusive of a printer job language code portion and a font data portion containing the received font data in its native form, when the font to be stored is a supported font other than a PostScript font or printer command language font, converting the font to a printer command language font and pre-appending selected printer job language software commands to the converted printer command language font data to create a new font file inclusive of a portion comprised of the selected printer job language software commands and a font data portion containing the received font data in its native form, and when the font to be stored is an unsupported font, returning an error message to the associated user;

communicating font data and appended printer job language software commands to a raster image processor inclusive of commands operative to instruct the raster image processor relative to decoding the font data;

parsing, via the raster image processor, a printer job language software command from font data to which it has been pre-appended;

decoding the font data, via the raster image processor, from instructions disposed in parsed printer job language software commands;

rasterizing the new, non-bitmapped font file in accordance with the received non-bitmapped font file and in accordance with font data decoded in the raster image processor in accordance with the instructions;

storing, in a storage disposed on a controller of the image generating device, the rasterized font file in an associated data storage for rendering of associated electronic document data;

receiving electronic document data into a spooler disposed on the image generating device;

receiving a document imaging request corresponding to electronic document data stored in the spooler;

testing font specification data in accordance with the font file data stored in the associated data storage;

retrieving a font data file from the associated storage in accordance with the step of testing; and commencing a rendering operation on electronic document data in the spooler in conjunction with the retrieved rasterized font data file.

2. The method according to claim 1 further comprising the step of storing the rendered document in the selected storage area.

3. The method according to claim 1 wherein the management request is received from an associated user via at least one of a simple management network protocol and a web administration user interface.

4. The method according to claim 1 wherein the image generating device is selected from the group consisting of a printing device, a facsimile device, a copying device, and a video display device.

5. A method to manage multiple format fonts in an image generating device, in a document processing device controller, comprising the steps of:

receiving a management request from an associated user workstation via an associated data network;

determining the type of management request received;

upon a determination that the management request received is a request to store a font in a selected storage area of the image generating device:

receiving, from the networked workstation, non-bitmapped font data corresponding to a received management request, determining, from the received font data, the type of font to be stored, selectively generating a new, non-bitmapped font file such that:

when the font to be stored is a PostScript font, pre-appending selected PostScript language code to the PostScript font data to create a new font file inclusive of a PostScript Language code portion and a font data portion containing the received font data in its native form;

when the font to be stored is a printer command language font, pre-appending selected printer job language software commands to the printer job language font data to create a new font file inclusive of a printer job language code portion and a font data portion containing the received font data in its native form;

when the font to be stored is supported font other than a PostScript font or printer command language font, converting the font to a printer command language font and pre-appending selected printer job language software commands to the converted printer command language font data to create a new font file inclusive of a portion comprised of the selected printer job language software commands and a font data portion containing the received font data in its native form, and when the font to be stored is an unsupported font, returning an error message to the associated user;

communicating font data and appended printer job language software commands to a raster image processor inclusive of commands operative to instruct the raster image processor relative to decoding the font data;

parsing, via the raster image processor, a printer job language software command from font data to which it has been pre-appended;

decoding the font data, via the raster image processor, from instructions disposed in parsed printer job language software commands;

rasterizing the new, non-bitmapped font file in accordance with the non-bitmapped font file and in accordance with font data decoded in the raster image processor in accordance with the instructions;

storing, in a storage disposed on a controller of the image generating device, a rasterized font file in an associated data storage for rendering of associated electronic document data, receiving electronic data into a spooler disposed on the image generating device, receiving a document imaging request corresponding to electronic document data stored in the spooler, testing, in the controller, font specification data in accordance with the font file data stored in the associated data storage, retrieving a font data file from the associated storage in accordance with the step of testing, and commencing a rendering operation on electronic document data in the spooler in conjunction with a retrieved rasterized font data file;

upon a determination that the management request received is to remove a selected font from a selected storage area of an image generating device:

creating a new file which includes a selected command and the font to be removed, determining if the selected font is stored in the storage area, and upon a determination that the selected font is stored in the storage area, removing the selected font from the storage area, and upon a determination that the management request received is to locate a selected type of font stored in a selected storage area of the image generating device:

determining if the selected type of font is stored in the storage area, generating a list of fonts corresponding to the selected type of font, and transmitting the list of fonts to the associated user via at least one of displaying the list of fonts on a display means or generating test documents listing the fonts.

6. The method according to claim 5 wherein the management request is received from an associated user via at least one of a simple management network protocol and a web administration user interface.

7. A method according to claim 5 wherein the image generating device is selected from the group consisting of a printing device, a facsimile device, a copying device, and a video display monitor.

8. A system to manage multiple format fonts in an image generating device, in a document processing device controller, comprising:

means adapted for receiving a management request from an associated user workstation via an associated data network, to store a font in a selected storage area of the image generating device;

means adapted for receiving, from the networked workstation, non-bitmapped font data corresponding to a received management request;

means adapted for determining the type of font to be stored;

means adapted for selectively generating a new, non-bitmapped font file such that:

when the font to be stored is a PostScript font, means adapted for pre-appending selected PostScript language code to the PostScript font data to create a new font file inclusive of a PostScript Language code portion and a font data portion containing the received font data in its native form, when the font to be stored is a printer command language font, means adapted for pre-appending selected printer job language software commands to the printer command language font data to create a new font file inclusive of a printer job language code portion and a font data portion containing the received font data in its native form, when the font to be stored is a supported font other than a PostScript font or printer command language font, means adapted for converting the font to a printer command language font and means adapted for pre-appending selected printer job language software commands to the converted printer command language font data to create a new font file inclusive of a portion comprised of the selected printer job language software commands and a font data portion containing the received font data in its native form, and when the font to be stored is an unsupported front, returning an error message to the associated user;

means adapted for communicating font data and appended printer job language software commands to a raster image processor inclusive of commands operative to instruct the raster image processor relative to decoding the font data;

means adapted for parsing, via the raster image processor, a printer job language software command from font data to which it has been pre-appended;

means adapted for decoding the font data, via the raster image processor, from instructions disposed in parsed printer job language software commands;

means adapted for rasterizing the new, non-bitmapped font file in accordance with the received non-bitmapped font file in accordance with font data decoded in the raster image processor in accordance with the instructions;

means adapted for storing, in a storage disposed on a controller of the image generating device, a generated rasterized font file in an associated data storage for rendering of associated electronic document data;

means adapted for receiving an electronic document data into a spooler disposed on the image generating device;

means adapted for receiving a document imaging request corresponding to electronic document data in the spooler;

means adapted for testing font specification data in accordance with the font file data stored in the associated data storage;

means adapted retrieving a font data file from the associated storage in accordance with the testing; and means adapted for commencing a rendering operation of electronic document data in the spooler in conjunction with a retrieved rasterized font data file.

9. The system according to claim 8 further comprising means adapted for storing the processed file in the selected storage area.

10. The system according to claim 8 wherein the management request is received from an associated user via at least one of a simple management network protocol and a web administration user interface.

11. The system according to claim 8 wherein the image generating device is selected from the group consisting of a printing device, a facsimile device, a copying device, and a video display device.

12. A system to manage multiple format fonts in an image generating device comprising:

means adapted for receiving a management request from an associated user workstation via an associated data network;

means adapted for determining the type of management request received;

upon a determination that the management request received is a request to store a font in a selected storage area of the image generating device:

means adapted for receiving, from the networked workstation, non-bitmapped font data corresponding to a received management request;

means adapted for determining the type of font to be stored;

means adapted for selectively generating a new non-bitmapped font file such that:

when the font to be stored is a PostScript font, means adapted for pre-appending selected PostScript language code to the PostScript font data to create a new font file inclusive of a PostScript Language code portion and a font data portion containing the received font data in its native form, when the font to be stored is a printer command language font, means adapted for pre-appending selected printer job language software commands to the printer command language font data to create a new font file inclusive of a printer job language code portion and a font data portion containing the received font data in its native form, when the font to be stored is a supported font other than a PostScript font or printer command language font, means adapted for converting the font to a printer command language font and means adapted for pre-appending selected printer job language software commands to the converted printer command language font data to create a new font file inclusive of a portion comprised of the selected printer job language software commands and a font data portion containing the received font data in its native form; and when the font to be stored is an unsupported font, returning an error message to the associated user;

means adapted for communicating font data and appended printer job language software commands to a raster image processor inclusive of commands operative to instruct the raster image processor relative to decoding the font data;

means adapted for parsing, via the raster image processor, a printer job language software command from font data to which it has been pre-appended;

means adapted for decoding the font data, via the raster image processor, from instructions disposed in parsed printer job language software commands;

means adapted for rasterizing the new, non-bitmapped font file in accordance with the received non-bitmapped font file and in accordance with font data decoded in the raster image processor in accordance with the instructions;

means adapted for storing, in a storage disposed on a controller of the image generating device, a generated rasterized font file in an associated data storage for rendering of associated electronic document data;

means adapted for receiving an electronic document data into a spooler disposed on the image generating device;

means adapted for receiving a document imaging request corresponding to electronic document data stored in the spooler;

means adapted for testing font specification data in accordance with the font file data stored in the associated data storage;

means adapted retrieving a font data file from the associated storage in accordance with the testing; and means adapted for commencing a rendering operation of electronic document data in the spooler in conjunction with a retrieved rasterized font data file;

upon a determination that the management request received is to remove a selected font from a selected storage area of an image generating device:

means adapted for creating a new file which includes a selected command and the font to be removed, means adapted for determining if the selected font is stored in the storage area, and upon a determination that the selected font is stored in the storage area, means adapted for removing the selected font from the storage area; and upon a determination that the management request received is to locate a selected type of font stored in a selected storage area of the image generating device:

means adapted for determining if the selected type of font is stored in the storage area, means adapted for generating a list of fonts corresponding to the selected type of font, and means adapted for transmitting the list of fonts to the associated user via at least one of displaying the list of fonts on a display means or generating test documents listing the fonts.

13. The system according to claim 12 wherein the management request is received from an associated user via at least one of a simple management network protocol and a web administration user interface.

14. The system according to claim 12 wherein the image generating device is selected from the group consisting of a printing device, a facsimile device, a copying device, and a video display monitor.

\* \* \* \* \*